(12) United States Patent
Grasshoff (10) Patent No.: US 11,876,394 B2
(45) Date of Patent: *Jan. 16, 2024

(54) ACTIVE CELL BALANCING IN BATTERIES USING SWITCH MODE DIVIDERS

(71) Applicant: Eric Paul Grasshoff, San Marcos, CA (US)

(72) Inventor: Eric Paul Grasshoff, San Marcos, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/146,787

(22) Filed: Jan. 12, 2021

(65) Prior Publication Data

US 2021/0143660 A1    May 13, 2021

Related U.S. Application Data

(63) Continuation-in-part of application No. 15/961,604, filed on Apr. 24, 2018, now Pat. No. 10,910,847.

(60) Provisional application No. 62/658,364, filed on Apr. 16, 2018, provisional application No. 62/609,063, filed on Dec. 21, 2017.

(51) Int. Cl.
*H01M 10/44* (2006.01)
*H01M 10/46* (2006.01)
*H02J 7/00* (2006.01)

(52) U.S. Cl.
CPC ........ *H02J 7/00718* (2020.01); *H02J 7/0019* (2013.01); *H02J 7/0024* (2013.01); *H02J 7/007194* (2020.01)

(58) Field of Classification Search
CPC .... H02J 7/0019; H02J 7/0024; H02J 7/00712; H02J 7/00718; H02J 7/007194; H02J 7/0016; H02J 7/0049; H01M 2010/4271; Y02E 60/10

USPC ........................ 320/107, 116, 118, 119, 122
See application file for complete search history.

(56) References Cited

U.S. PATENT DOCUMENTS

| | | |
|---|---|---|
| 5,504,415 A | 4/1996 | Podrazhansky et al. |
| 5,528,122 A | 6/1996 | Sullivan et al. |
| 5,578,914 A | 11/1996 | Morita |
| 5,631,534 A | 5/1997 | Lewis |
| 5,773,959 A | 6/1998 | Merritt et al. |
| 5,897,973 A | 4/1999 | Stephenson et al. |
| 5,920,179 A | 7/1999 | Pedicini |
| 5,982,142 A | 11/1999 | Sullivan et al. |
| 6,008,623 A | 12/1999 | Chen et al. |
| 6,081,095 A | 6/2000 | Tamura et al. |
| 6,118,275 A | 9/2000 | Yoon et al. |
| 6,150,795 A | 11/2000 | Kutkut et al. |

(Continued)

FOREIGN PATENT DOCUMENTS

| | | |
|---|---|---|
| CN | 201466770 U | 5/2010 |
| CN | 107086625 A | 8/2017 |

(Continued)

OTHER PUBLICATIONS

Translation of JP2014147148 (Aug. 14, 2014) (Year: 2014).*

(Continued)

*Primary Examiner* — Edward Tso
(74) *Attorney, Agent, or Firm* — Cotman Ip law Group (57) ABSTRACT

A battery cell balancing system contains a switch mode circuit employing voltage sensors across the cells and current on the balancing legs to enable reliable and efficient cell balancing during battery charge.

28 Claims, 5 Drawing Sheets

(56) References Cited

U.S. PATENT DOCUMENTS

| | | |
|---|---|---|
| 6,271,645 B1 | 8/2001 | Schneider et al. |
| 6,452,363 B1 | 9/2002 | Jabaji |
| 6,750,631 B2 | 6/2004 | Perelle |
| 6,806,686 B1 | 10/2004 | Rap |
| 7,193,392 B2 | 3/2007 | King et al. |
| 7,245,108 B2 | 7/2007 | Chertok et al. |
| 7,378,818 B2 | 5/2008 | Fowler et al. |
| 7,400,114 B2 | 7/2008 | Anzawa et al. |
| 7,489,109 B1 | 2/2009 | Qian et al. |
| 7,612,530 B2 | 11/2009 | Konishi et al. |
| 7,615,966 B2 | 11/2009 | Houldsworth et al. |
| 7,786,699 B2 | 8/2010 | Demers et al. |
| 7,808,244 B2 | 10/2010 | Barsukov et al. |
| 7,856,328 B2 | 12/2010 | Barsoukov et al. |
| 7,888,910 B2 | 2/2011 | Zeng |
| 7,973,514 B2 | 7/2011 | Gong et al. |
| 8,115,453 B2 | 2/2012 | Houldsworth et al. |
| 8,242,738 B2 | 8/2012 | Barsukov |
| 8,253,378 B2 | 8/2012 | Lee et al. |
| 8,421,416 B2 | 4/2013 | Hsu et al. |
| 8,441,234 B2 | 5/2013 | Cheng et al. |
| 8,450,978 B2 | 5/2013 | Barsukov et al. |
| 8,476,869 B2 | 7/2013 | Shiu et al. |
| 8,581,549 B2 | 11/2013 | Hartzog |
| 8,736,231 B2 | 5/2014 | Sutardja |
| 8,766,597 B2 | 7/2014 | Nork et al. |
| 8,901,884 B2 | 12/2014 | Maleus |
| 8,901,885 B2 | 12/2014 | Kelty et al. |
| 8,937,457 B2 | 1/2015 | Sutardja et al. |
| 8,963,494 B2 | 2/2015 | Kishiyama et al. |
| 8,965,721 B2 | 2/2015 | Paryani |
| 8,970,173 B2 | 3/2015 | Kelty et al. |
| 8,970,182 B2 | 3/2015 | Paryani et al. |
| 9,000,726 B2 | 4/2015 | Sakurai et al. |
| 9,046,580 B2 | 6/2015 | Hermann |
| 9,130,377 B2 | 9/2015 | Barsukov et al. |
| 9,153,990 B2 | 10/2015 | LePort et al. |
| 9,197,091 B2 | 11/2015 | Kishiyama et al. |
| 9,201,121 B2 | 12/2015 | Barsukov et al. |
| 9,203,121 B2 | 12/2015 | Liu |
| 9,209,631 B2 | 12/2015 | Hermann et al. |
| 9,225,179 B2 | 12/2015 | Liu |
| 9,225,197 B2 | 12/2015 | Krauer |
| 9,236,748 B2 | 1/2016 | Barsukov et al. |
| 9,257,729 B2 | 2/2016 | Hermann et al. |
| 9,270,127 B2 | 2/2016 | Coenen et al. |
| 9,276,415 B2 | 3/2016 | Soong |
| 9,356,467 B2 | 5/2016 | Lammeren |
| 9,362,772 B2 | 6/2016 | Hua et al. |
| 9,385,553 B2 | 7/2016 | Mura |
| 9,705,340 B2 | 7/2017 | Lucea |
| 9,774,206 B2 | 9/2017 | Kim et al. |
| 9,847,655 B2 | 12/2017 | Bailly et al. |
| 9,853,497 B2 | 12/2017 | Heidenreich et al. |
| 9,893,539 B2 | 2/2018 | Nakamura et al. |
| 9,979,211 B2 | 5/2018 | Barsukov et al. |
| 10,910,847 B2 * | 2/2021 | Grasshoff ............ H02J 7/0016 |
| 2003/0017753 A1 | 1/2003 | Palmisano et al. |
| 2004/0189248 A1 | 9/2004 | Boskovitch et al. |
| 2006/0022639 A1 | 2/2006 | Moore |
| 2007/0049134 A1 | 3/2007 | Conroy et al. |
| 2008/0180061 A1 | 7/2008 | Koski et al. |
| 2011/0062917 A1 | 3/2011 | Shiu et al. |
| 2011/0316344 A1 | 12/2011 | Lammeren |
| 2011/0316483 A1 | 12/2011 | Zhang |
| 2013/0057198 A1 | 3/2013 | Gerlovin |
| 2014/0084871 A1 | 3/2014 | Densham et al. |
| 2014/0232346 A1 | 8/2014 | Zhang et al. |

FOREIGN PATENT DOCUMENTS

| | | |
|---|---|---|
| EP | 2854254 A1 | 4/2015 |
| JP | 2005521363 A | 7/2005 |
| JP | 5140470 B2 | 10/2009 |
| JP | 5366482 B2 | 3/2010 |
| JP | 2011091897 A | 5/2011 |
| JP | 5864320 B2 | 9/2013 |
| JP | 2014147148 A | 8/2014 |
| KR | 101423064 B1 | 7/2014 |
| WO | 2011158051 A1 | 12/2011 |

OTHER PUBLICATIONS

Translation of JP5864320 (Sep. 30, 2013) (Year: 2013).*
Translation of JP5366482 (Mar. 18, 2010) (Year: 2010).*
Translation JP2011091897 (May 6, 2011) (Year: 2011).*
Translation of JP5140470 (Oct. 8, 2009) (Year: 2009).*
"Effective LiFePO4 Battery Charging and Maintenance", CTEK Lithium US, www.smartercharger.com.
"Fundamentals of Qnovo Adaptive Charging in Lithium Ion Batteries", Qnovo, 2015.
"Programmable Li-Ion PCM", Arbarr Electronics Ltd., Antrim, Northern Ireland/Denver, Colorado.
Da Howey, V Yufit, Pd Mitcheson, Gj Offer, Np Brandon, "Impedance measurement for advanced battery management systems", EVS27, Barcelona, Spain, Nov. 17-20, 2013.
David Capano, Sheldon S. Williamson, "Power Electronics Intensive Battery Management Systems for Electric Transportation", NSERC Canada Research Chair Program, University of Ontario Institute of Technology (UOIT), Ontario, Canada, Mar. 20-23, 2017.
Dr. Gregory L. Plett, "Cell Balancing", from the course Battery Management and Control, University of Colorado, Spring 2015.
Eric Paul Grasshoff, "Active Cell Balancing in Batteries Using Switch Mode Dividers", parent U.S. Appl. No. 15/961,604, Applicant's response to Non-Final Office Action filed Sep. 11, 2020.
Eric Paul Grasshoff, "Active Cell Balancing in Batteries Using Switch Mode Dividers", parent U.S. Appl. No. 15/961,604, Non-Final Office Action dated Jul. 23, 2020.
Eric Paul Grasshoff, "Active Cell Balancing in Batteries Using Switch Mode Dividers", parent U.S. Appl. No. 15/961,604, Notice of Allowance dated Sep. 29, 2020.
James Moran, "Power Pump™ Balancing", Application Report, PMP—battery Management Solutions, Texas Instruments, Jul. 2009—Revised Oct. 2011.
Jong-Won Shin, Gab-Su Seo, Chang-Yoon Chun, Bo-Hyung Cho, "Selective Flyback Balancing Circuit with Improved Balancing Speed for Series Connected Lithium-ion Batteries", School of Electric Engineering and Computer Science, Seoul National University, Jul. 2010, Seoul, Korea.
Keith James Keller, "Improved LiFePO4 cell balancing in battery-backup systems with an Impedance Track™ fuel gage", Analog Field Applications, Texas Instruments, Incorporated, 2013.
Kevin B. Scott, Sam Nork, "Active Battery Cell Balancing", Linear Technology, Aug. 18, 2016.
Kevin B. Scott, Sam Nork, "Passive Battery Cell Balancing", Linear Technology, Aug. 18, 2016.
M. Brandl, H. Gall, M. Wenger, V. Lorentz, M. Giegerich, F. Baronti, G. Fantechi, L. Fanucci, R. Roncella, R. Saletti, S. Saponara, A. Thaler, M. Cifrain, W. Prochazka, "Batteries and Battery Management Systems for Electric Vehicles", Design, Automation & Test in Europe Conference & Exhibition, Mar. 12-16, 2012, Dresden, Germany.
Naoki Matsumura, "Battery Cycle Life Extension by Charging Algorithm to Reduce IOT Cost of Ownership", Intel, 34th International Battery Seminar & Exhibit, Mar. 23, 2017.
Phillip Weicker, "A Systems Approach to Lithium-Ion Battery Management", sections of pp. 190-192, 2014, Artech House, Norwood, MA.
Siqi Li, Chunting Chris Mi, Mengyang Zhang, "A High-Efficiency Active Battery-Balancing Circuit Using Multiwinding Transformer", IEEE Transactions on Industry Applications, Jan./Feb. 2013, vol. 49, No. 1.
Tony Armstrong, Samuel Nork, "Maximize the Run Time in Automotive Battery Stacks Even as Cells Age", Analog Dialogue, vol. 51, Dec. 2017.
Yevgen Barsukov, Jinrong Qian, "Cell-Balancing Techniques: Theory and Implementation", Battery Power Management for Portable Devices, Chapter 4, 2013, Artech House, Boston/London.

(56) References Cited

OTHER PUBLICATIONS

Yuang-Shung Lee, Guo-Tian Cheng, "Quasi-Resonant Zero-Current-Switching Bidirectional Converter for Battery Equalization Applications", IEEE Transactions on Power Electronics, Sep. 2006, vol. 21, No. 5.
International Search Report and Written Opinion from PCT application PCT/US2018/065523 dated Apr. 25, 2019.

* cited by examiner

ACTIVE CELL BALANCING IN BATTERIES USING SWITCH MODE DIVIDERS

FIELD

The application relates generally to balancing battery cells during charging or discharging.

BACKGROUND

Cells connected in series in rechargeable batteries tend towards an out-of-balance state when subjected to repeated charge/discharge cycles, or when left uncharged for long periods of time. This problem is common in rechargeable battery systems and is particularly acute in lithium-ion batteries (LIB s). Existing attempts to mitigate this out-of-balance problem have met with only limited success.

SUMMARY

Accordingly, an assembly includes at least one switch mode divider (SMD) connectable in parallel to at least one respective battery cell and operable to equalize voltages between plural battery cells during charging of the battery cells, the SMD being characterized by a control output voltage Vo that is a function of a duty cycle of a drive waveform and high and low rail voltages. The assembly also includes at least one circuit that generates a signal representative of current and being associated with a control output voltage of the at least one SMD to enable the SMD to limit current from the SMD to at least one of the battery cells during charging.

In some embodiments, the circuit comprises a current sensor that generates the signal based on current sensed by the current sensor.

In other embodiments, the circuit comprises a controller that generates the signal based on an estimation of current.

In another aspect, an apparatus includes at least first and second battery cells arranged in electrical series with each other and defining a primary charge/discharge path. A balancing circuit is arranged in electrical parallel with the primary charge/discharge path. The balancing circuit includes a voltage sensor line that in turn includes a respective positive node and a respective negative node and at least one cell junction between respective adjacent battery cells. The apparatus includes at least one voltage sensor. The apparatus further includes a respective switch mode divider (SMD) connected to a respective cell junction. At least one controller controls the respective SMDs to equalize voltages between battery cells.

In another aspect, a method includes modulating at least one switch mode divider (SMD) associated with respective battery cells to equalize voltage between the battery cells during battery charge. The SMD is characterized by being driven by a constant period signal having an ON time and OFF time, the sum of which equals to a total constant period. The method further includes limiting current in at least one balancing leg associated with the at least one SMD to satisfy a threshold.

In another aspect, an assembly includes at least one switch mode divider (SMD) connectable in parallel to at least one respective battery cell and operable to equalize voltages between plural cells during charging of the cells. At least one current sensor is associated with a control output voltage of the SMD to enable the SMD to limit current from the SMD to at least one cell during charging.

In another aspect, a method includes modulating plural switch mode dividers (SMDs) associated with respective cells to equalize voltage between the cells during battery charge or discharge. The method further includes limiting current in at least one balancing leg associated with at least one SMD to satisfy a threshold. The threshold specifies the maximum magnitude of current that can pass through the balancing leg in either direction (positive or negative current).

The details of the present application, both as to its structure and operation, can best be understood in reference to the accompanying drawings, in which like reference numerals refer to like parts, and in which:

DETAILED DESCRIPTION

This disclosure relates generally to charging batteries and has particular relevance to charging rechargeable batteries that use cells that have low dynamic impedance, one example of which is Lithium-ion batteries. A system herein may include batteries, components powered by the batteries, and charging assemblies that may include one or more computing components to control charging. Charging assemblies may include one or more processors executing instructions that configure the assemblies to control charging consistent with present principles. As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device, or an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The following terms may be used herein:

Battery Capacity—the amount of energy available in a battery, typically expressed in Amp-hours (Ah) or Watt-hours (Wh) for larger batteries.

Cell—is an electrical energy storage unit, typically consisting of an anode, a cathode, an electrolyte, and a separator. A battery can consist of a single cell or many cells connected in series and/or in parallel. In the context of balancing a battery, a group of cells connected in parallel is treated as a single large cell.

State of Charge (SOC)—the amount of energy available in a cell or battery at any given moment, typically stated as a percent of Full Battery Capacity (FBC).

State of Health (SOH)—an indication of the present Full Battery Capacity (FBC) of a battery relative to the battery's Nominal Battery Capacity when it was new. For example, if the nominal capacity of a battery (when new) is 200 Ah, and after some period of use the FBC drops to 160 Ah, then the SOH of the battery is 80%.

Primary Charge Path—refers to a charging path straight down the series of battery cells. Balance—A battery is balanced when, at the terminal stage of charging, the cell voltages have been equalized in which every cell (where "cell" can be a group of individual cells connected in parallel) is at Full Charge Voltage and charging has typically continued thereafter until the balancing current has dropped to a threshold low level as further explained below, at which point the battery is balanced.

Equalize—is used to describe the process of reducing differences in cell voltages during the charging and balancing process with a goal of bringing a battery into balance.

Note that "balanced" and "out of balance" are relative terms. For present purposes, a battery is considered balanced if the SOCs of all the cells in the battery are within approximately ±1% of each other.

Balancing Current—refers to the differences in charge (or discharge) current applied to a subset of the cells in the battery to attempt to bring the cells into balance.

Balancing Leg—refers to a conductive path that is off the Primary Charge Path and that is used for applying charge or discharge currents to a subset of cells in an attempt to balance the battery.

True Battery Capacity—is the capacity of a battery when every cell in the battery is charged to 100% SOC.

Available Battery Capacity—the capacity of a battery at any given instant.

Nominal Battery Capacity—refers to nominal capacity of a battery when new.

Full Battery Capacity—refers to the available capacity in the battery after the charging system has charged the battery as fully as the system is capable of.

True Battery Capacity vs. Full Battery Capacity—If a charging system cannot or does not bring every cell up to 100% SOC at the end of a complete charge cycle, then Full Battery Capacity will be less than True Battery Capacity.

Cell Voltage—the voltage of a cell at any instant.

Nominal Voltage—the average or mean voltage of a cell or battery over the flat region of the discharge curve.

Full Charge Voltage—the voltage to which a cell or battery is brought to at the end of a charging cycle.

Cell Impedance—refers to cell voltage divided by cell current.

Dynamic Impedance—the first derivative of the voltage with respect to current—$dV/dI$.

Figure 1:
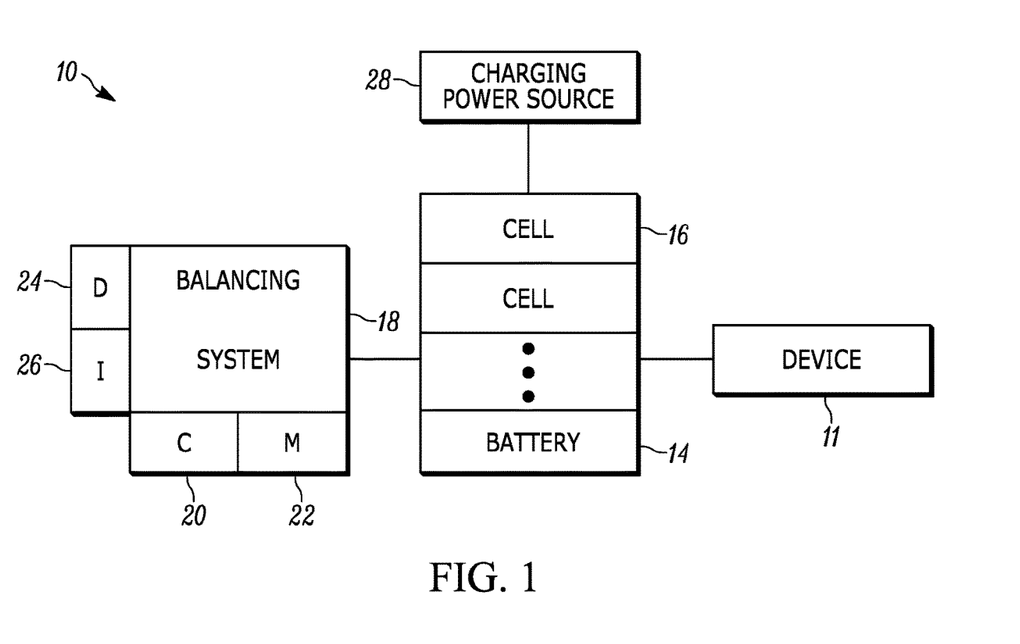
FIG. 1 is a block diagram of an example system consistent with present principles.

Now specifically referring to FIG. 1, an example system 10 is shown, which may include one or more of the example devices mentioned above and described further below in accordance with present principles. The first of the example devices included in the system 10 is a device 11, such as a consumer electronics (CE) device, e.g., a tablet computer, a notebook computer, a wearable computerized device, a computerized Internet-enabled bracelet, other computerized Internet-enabled devices, a computerized Internet-enabled music player, computerized Internet-enabled headphones, a computerized Internet-enabled implantable device such as an implantable skin device, etc. Other example devices 11 include energy storage modules (such as battery arrays) in electric vehicles, industrial power systems, and storage devices used in power grid or structure electrical systems.

The device 11 may be powered by a rechargeable battery 14, such as a Lithium-ion battery with plural cells 16 connected together in electrical series with each other, it being understood that while only a single connection is shown between the battery 14 and device 11, more than one electrical line typically connects the battery to the device. The battery 14 may be removably or non-removably coupled to the housing of the device 11. A Lithium-ion battery may be implemented by any battery that uses lithium, including batteries that use cathodes with chemistries such as Lithium Iron Phosphate, Lithium Cobalt Oxide, Lithium Nickel Manganese Cobalt Oxide, Lithium Manganese Oxide, Lithium Nickel Cobalt Aluminum Oxide, Lithium Titanate, or any other battery chemistry that uses lithium ions. While present principles envision, in example embodiments, use in connection with Li-ion batteries, present principles contemplate use with any appropriate stored energy source or storage element, in particular (though not exclusively) those that exhibit a low impedance characteristic during charge/discharge.

As discussed further below, a balancing system 18 can be electrically connected to the battery 14 while charging or discharging the battery 14. The balancing system 18 can be incorporated all or in part within the housing of the device 11 or it may be separate therefrom. The balancing system 18 can be enclosed inside the battery case or it can be disposed outside the battery case.

Among the components of the balancing system 18 that are more fully disclosed below are at least one controller 20 and at least one data storage medium 22. If desired, the balancing system 18 may also include one or more displays 24 such as a liquid crystal display (LCD) and one or more input devices 26 such as a network interface, universal serial bus (USB) port, key entry device, etc. A network interface may provide for communication over one or more networks such as the Internet, a wide area or local area network, a Wi-Fi network, a wireless telephony network, a Bluetooth network, etc.

The data memory 22 may be, without limitation, disk-based or solid-state storage that is not a transitory signal. The memory may be removable media.

In any case, as discussed further below, the balancing system 18 acts to equalize the voltages of the individual cells 16 during charging from a charging power source 28.

Figure 2:
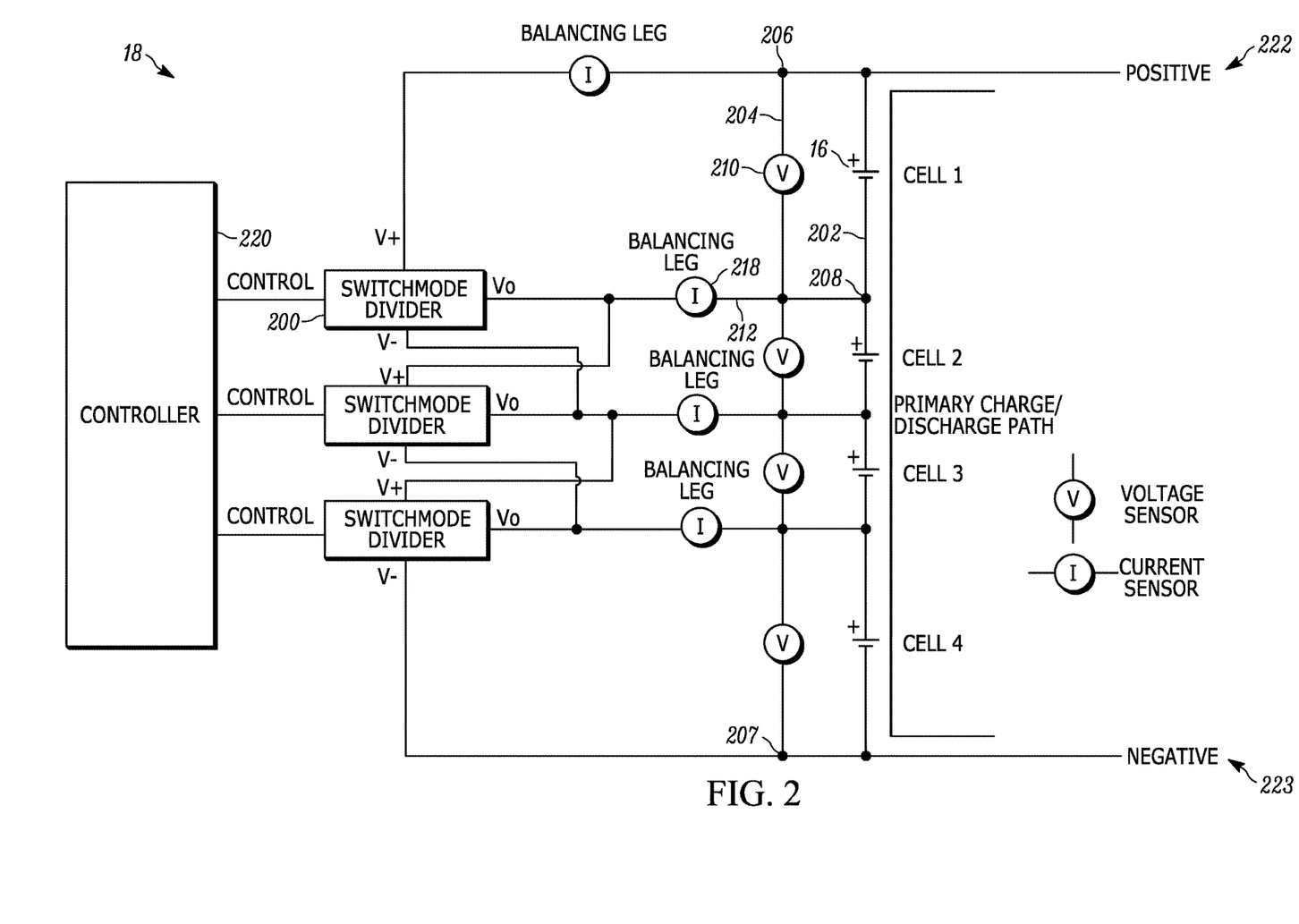
FIG. 2 is a schematic diagram of a circuit for balancing cell voltage during charging of a battery such as a Lithium-ion battery with multiple cells in series.

Turning now to FIG. 2 for a more detailed depiction of an example balancing system 18, the balancing system 18 includes plural switch mode dividers (SMDs) 200. As understood herein, a balancing system that uses SMDs 200 can overcome limitations of less efficient balancing systems. The low impedance current paths of the switch mode design provide higher efficiency at moving energy to balance cells in the battery as compared to balancing technologies which do not employ switch mode dividers. But the low impedance of the switch mode design results in a control system with high loop gain, rendering the control loop very sensitive to even the most modest differences in voltages of the cells 16. Current sensors 218 in the below-described balancing legs 212 of the balancing system 18 are used to determine whether the current in the balancing legs 212 is within the threshold range that is specified by the below-described threshold(s) for the balancing system 18. This current measurement enables the balancing system 18 to limit the loop gain of the circuit, resulting in more effective control of the high-gain loop.

In general, and prior to describing the details of the balancing system 18, the SMDs 200 are high power (low impedance) voltage dividers. The control output voltage Vo is a function of the duty cycle of the drive waveform and of the high and low rail voltages (V+ and V−) of the respective SMD 200.

In accordance with switch-mode circuit techniques, each SMD 200 is driven by a constant period signal having a unique ON time and OFF time, the sum of which two times is essentially always equal to the total constant period. SMD modulation takes the form of Pulse Width Modulation (PWM) in that the ratio of ON time to total period (also defined as duty cycle) is adjusted to vary the control output voltage Vo in direct correspondence.

If the duty cycle is 50%, the output voltage will be at the midpoint between the high rail voltage and the low rail voltage. The low impedance of the SMD-based balancing system 18 allows relatively large balancing current levels to be applied to the cells 16 at very high efficiency. Because both the SMD 200 and the Li-ion cell 16 are very low impedance devices which are essentially connected in parallel, a very small change in the duty cycle, creating a small voltage difference, produces a relatively high corresponding level of differential balancing leg current. When changing the voltage that is applied to low impedance cells to charge and/or balance them, the resulting high-gain response can create feedback instability for the balancing system, a problem that is addressed by use of the below-described current sensors 218 in the balancing legs 212.

Accordingly, and turning to the details of FIG. 2, plural battery cells 16, in the example shown four cells, are arranged in electrical series with each other as shown to define a primary charge/discharge path 202. The series of cells comprises a battery that has a positive terminal 222 and a negative terminal 223. The balancing circuit 18 is arranged in electrical parallel with the primary charge/discharge path 202 as shown.

The balancing circuit 18 includes a voltage sensor line 204 in parallel with the primary charge/discharge path 202. The voltage sensor line 204 includes a positive node 206 to which the "high" or positive side of the first SMD 200 (the top-most labeled V+ in FIG. 2) is electrically coupled and a negative node 207 to which the "low" or negative side of the last SMD 200 (the bottom-most labeled V− in FIG. 2) is electrically coupled. The control output Vo of each SMD 200 is connected to a respective balancing leg 212 that includes a respective current sensor 218 and terminates at a respective cell junction 208 between adjacent cells 16 as shown. Note that in example embodiments a total of N−1 SMDs 200 are provided for N cells 16. Note further that in order from top to bottom, the negative side (V−) of the top-most SMD 200 is connected to the control output voltage Vo of the next (middle, in the example shown) SMD 200, while the positive side V+ of the middle SMD 200 is connected to the control output voltage Vo of the top-most SMD, with this pattern repeated in all of the SMDs as shown.

In other words, the positive rail (V+) of each SMD 200 is connected to the balancing leg 212 that is next highest in the series or is connected to the positive node 206 and to positive terminal 222 if there is no higher balancing leg in the series. The negative rail (V−) of each SMD 200 is connected to the balancing leg 212 that is next lowest in the series or is connected to the negative node 207 and negative terminal 223 if there is no lower balancing leg in the series. The control output voltage Vo of each SMD 200 is connected to the balancing leg 212, which passes through the current sensor to the respective cell junction 208.

A respective voltage sensor 210 is in the voltage sensor line 204 in electrical parallel with a respective cell 16 to generate a signal representative of voltage across the respective cell 16. The voltage sensors 210 are communicatively coupled to the controller 220 as described further below, so that the controller 220 receives voltage information from the respective voltage sensor 210.

The control output voltage Vo of each SMD 200 is connected via a respective balancing leg 212 to the respective cell junction 208. The balancing legs 212, in some examples, consist of the electrical circuit shown between the nodes shown connecting Vo to the respective cell junctions 208. A respective current sensor 218 is electrically connected to the balancing legs 212 in electrical series between the control output voltage Vo from each SMD 200 and the respective cell junction 208 to generate a signal representative of current through the respective balancing leg 212. Note that the current sensor 218 shown in FIG. 2 in the top-most positive line that includes the positive node 206 is optional. Each current sensor 218 is communicatively coupled to the controller 220 discussed below so that the controller receives balancing leg current information from the current sensors 218.

Accordingly, at least one controller 220, preferably a digital microcontroller, is connected to the SMDs 200 to modulate the SMDs 200 to establish the control output voltage Vo of each SMD 200 that adds to or subtracts from the voltage on the primary charge path 202 for the respective cell 16 to maintain current on the balancing legs 212 within certain limits as explained further below.

In establishing the control output voltage Vo, the duty cycle of the SMD 200 is increased to raise the output voltage and decreased to lower it as discussed above and further explained below.

Figure 3:
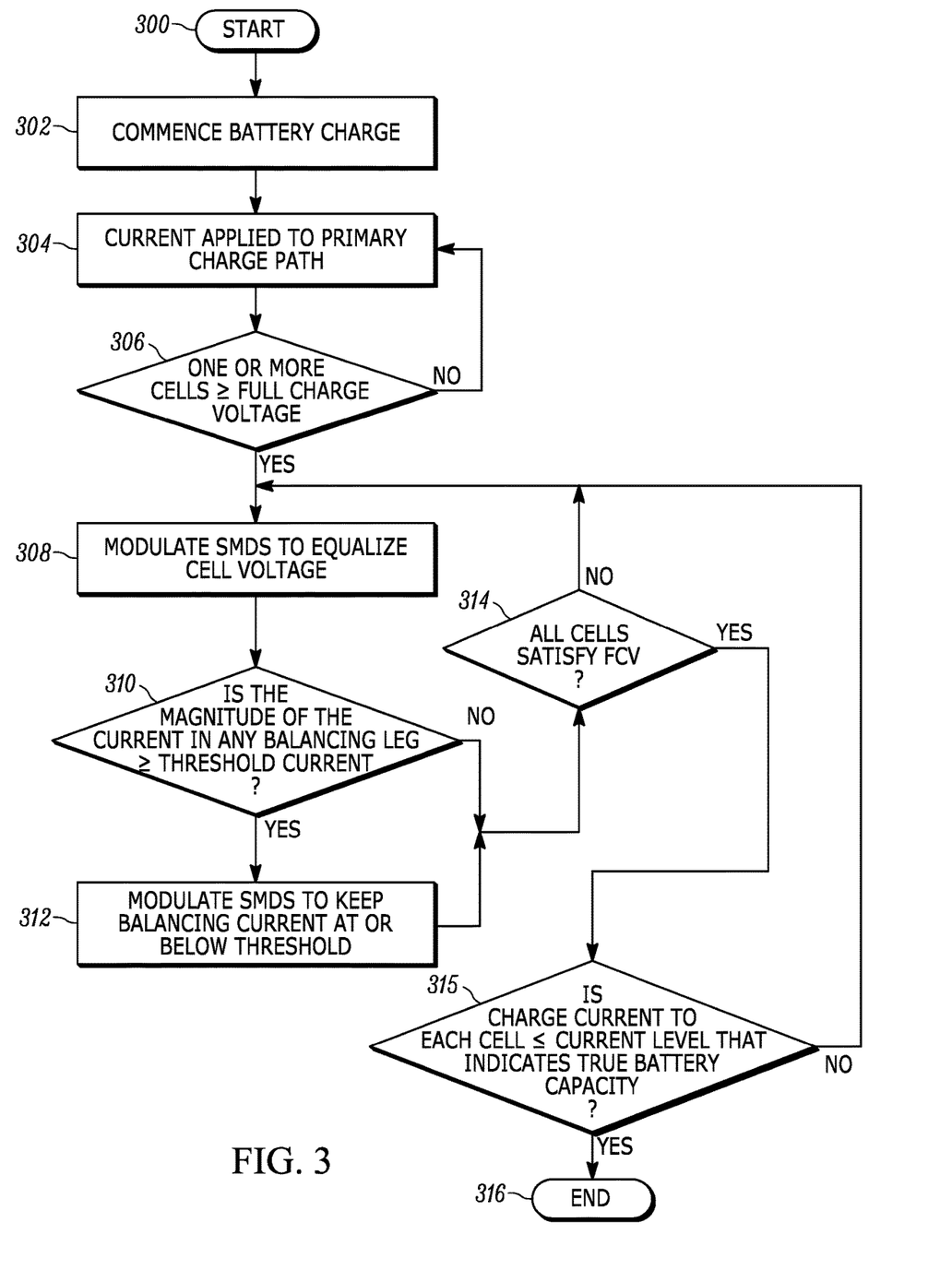
FIG. 3 is a flow chart of example logic according to an example embodiment.

FIG. 3 illustrates the operation of the balancing system 18 shown in FIG. 2. The process begins at start state 300. Battery charge is commenced at block 302 on a battery 14 with each cell 16 at any SOC and with the cells 16 in any condition of balance or out-of-balance, typically below Full Charge Voltage. Block 304 indicates that charging is commenced by applying charge current, flowing from the positive to negative terminals on the primary charge/discharge path 202. The magnitude of the current on the primary charge/discharge path 202 may typically be greater than the magnitude of the balancing current on the balancing legs 212.

The voltage of each cell 16 is monitored using the respective voltage sensors 210, and when it is determined at decision diamond 306 that at least one cell 16 reaches or exceeds Full Charge Voltage (FCV), the logic proceeds to block 308 to modulate the SMDs 200 to equalize the cell voltages. That is, in example implementations, the cell equalization with current-limiting operation discussed below starts only when the first cell reaches FCV. In other embodiments input from the current sensors is used by the controller to limit current through the balancing legs to be no more than a threshold current magnitude before at least one cell reaches full charge voltage during battery charge.

Should a cell 16 reach a voltage above full charge voltage as indicated by the respective voltage sensor 210 of the cell 16, the controller 220 lowers the voltage of the cell 16 by modulating the SMD 200 that is associated with the overvoltage cell 16 to reduce the cell's voltage at a controlled rate until the voltage is at or just below FCV.

As the SMDs 200 are being used to alter the cell voltages, the logic determines at decision diamond 310 whether the magnitude of the current (positive or negative) as measured by any balancing leg current sensor 218 is at or beyond a threshold value, typically a maximum allowed current magnitude. This applies to limiting both negative and positive current, because balancing current can flow in either direction. Note that one threshold may be used for negative current and another, different threshold may be used for positive current, or a single threshold may apply to both. Should the magnitude of any balancing leg current satisfy the threshold, e.g., by being at or beyond the threshold at decision diamond 310, for instance as a result of having applied modulation of block 308 at an excessive rate of change, the logic moves to block 312 to modulate the SMDs 200 to adjust the voltages of adjacent cells 16 to bring the balancing leg current magnitude at or below the threshold.

In other words, if at any time during the balancing process, the control of the output voltages Vo to equalize the cell voltages are adjusted in a manner that results in the magnitude of the current in any balancing leg 212 to be at or beyond the limit threshold, then the modulation of an SMD 200 that is at and/or adjacent to the balancing leg 212 with excessive current is adjusted to reduce the voltage differential between the cell 16 with excessive balancing current and one or both adjacent cells 16.

The controller 220 preferably establishes as much of the allowed magnitude of balancing current as possible, albeit always below the maximum permitted threshold, to provide for the fastest charging and balancing without violating the threshold for balancing leg current magnitude. Thus, in example embodiments the balancing current magnitude is maintained at a high level at or below a threshold to prevent overcurrent conditions that could damage the system 16 or pose a safety hazard.

The above monitoring of voltage and current data and SMD modulation continues preferably until at least one and more preferably two conditions are met. As indicated at decision diamond 314 it is determined whether all cells 16 have reached FCV. If not, the process loops back to block 308. If all cells have reached FCV, the logic can move from decision diamond 314 to decision diamond 315 to determine whether the current to each cell has decreased to a level indicative of the battery 14 having reached True Battery Capacity. If so, the process ends at state 316. Otherwise, the logic loops back to block 308.

In modulating the SMDs 200, if the controller 220 determines, based on the signal from a balancing leg current sensor 218, that the current flowing in the balancing leg 212 is too high (e.g., above the threshold) in the positive direction (from the SMD 200 into the respective cells 16) then the duty cycle of the SMD 200 is reduced to lower its control output voltage Vo. On the other hand, if the current in the balancing leg 212 is too great in the negative direction then the controller modulates SMD 200 to increase its duty cycle and thus raise its control output voltage $V_O$.

Note that the controller 220 samples all cell voltages as indicated by the voltage sensors 210 for ongoing modulation of the SMDs 200 to equalize cell voltages while maintaining balancing leg current magnitudes at or below the threshold for balancing currents. When SMD 200 control output voltage Vo at any one cell 16 is altered, it will affect the adjacent cells 16 and adjacent balancing leg currents because the cells 16 are connected in series, so modulation and adjustment of the output voltages of the SMDs 200 is typically an ongoing process while the balancing system 18 is operating.

If desired, the threshold magnitude for the balancing leg current may be established as a function of battery capacity, chemistry of the battery, design of the battery, and use environment. In general, the threshold magnitude of the balancing leg current is selected to be a suitable percentage of the maximum permissible charging current based on the design objectives of the battery system. A higher balancing current threshold allows the cells 16 to reach a balanced state in a shorter time, but a too-high threshold can lead to cell or system damage, so the threshold is established to ensure current in the balancing leg 212 remains below the cell or system stress level.

As an example, in larger batteries a balancing current range threshold of 5% to 10% of the maximum primary charge current is typically sufficient to ensure 100% balancing within an hour or two under conditions of the battery 14 and cells 16 that would typically occur. The closer the SOCs of the cells 16 are to each other, the lower the balancing range required to achieve complete balance over any given time period. Some designers may opt for a lower range of 2% to 3%, for example, to save cost; while others may opt for a higher range (20% or 30% of maximum primary charge current, for example) if faster balancing times are more important than system cost.

It may now be appreciated that currents on the balancing legs 212 can be advantageously used as proxies for the charge current to each cell 16 in the primary charge path 202. As understood herein, current in the balancing legs 212 correlates closely enough to the main charging current on the primary charge path 202 that it can be used to determine when each cell 16 has reached 100% SOC. This allows the current sensors 218 to be placed on the balancing legs 212 and allows use of current sensors 218 with much lower current rating than would be needed to sense current on the primary charge path 202. The use of two inputs—current on the balancing legs 212, and voltage on each cell 16—enables very high efficiency (from the switch mode circuit) and very good stability (from the addition of the current sensors 218). Moreover, the circuit 18 can reliably, efficiently, and accurately bring every cell 16 in the battery 14 up to 100% SOC at the end of every complete charge cycle. In other words, by monitoring cell voltage and balancing leg current, the controller 220 can detect when cells 16 reach Full Charge Voltage and then subsequently reach 100% SOC. When a cell 16 first reaches Full Charge Voltage, it is usually not yet at 100% SOC, so additional charging is typically required after Full Charge Voltage to bring the cell up to 100% SOC, which is made possible by the balancing leg current sensor 218 input, which enables accurate, reliable determination of when a cell 16 has reached 100% SOC. An indication of 100% SOC occurs when a cell 16 is at Full Charge Voltage as indicated by the respective voltage sensor 210 and current to the cell 16 as indicated by the current sensor 218 associated with the cell 16 has dropped to a very low level, typically around 0.05C to as low as 0.01C, wherein "C" is a measure of current rate relative to a capacity of the cell.

Furthermore, locating the current sensors 218 on the balancing legs 212 avoids compromising the battery's primary charge path 202.

In addition to enabling management of the inherent differences in voltage drop among the various cells 16, using the balancing current as an input to the feedback loop used by the controller 220 mitigates the instability disadvantage of the low impedance SMD 200 configuration while maintaining all the added advantages of that configuration. Using the current sensors 218, cell voltages need only be approximately measured, while limiting the current in the balancing legs 212 to a finite maximum level effectively eliminates potential loss of control of a high-gain charging system.

Still further, current and voltage sensors of relatively low accuracy (typical accuracy of 2% of maximum cell voltage for the voltage sensors 210 and 0.03C for the current sensors 218) are sufficient because the accuracy (or resolution) of voltage and current measurement only needs to be great enough to detect possible runaway current conditions and make corrections to prevent them, and to ensure that cells 16 do not rise above Full Charge Voltage and/or do not approach Maximum Cell Voltage (the maximum voltage a cell can be charged to without incurring risk of damage to the cell.)

Also, current sensors 218 on the balancing legs 212 can be rated to be relatively small and inexpensive as compared to current sensors that might be placed in the primary charge path 202; the current sensors 218 on the balancing legs 212 do not siphon off energy from primary charge path 202, which would reduce the efficiency of the system; and unlike larger current sensors on the primary charge path, balancing leg current sensors do not generate undue heat.

Because high charge current can be efficiently and safely applied throughout the charge cycle, with charge current dropping to a low level as any cell 16 reaches Full Charge Voltage, faster charge cycles than currently are provided are realized by the circuit 18. Furthermore, the balancing circuit 18 can balance cells 16 that are significantly out of balance. As long as no cell 16 is defective (essentially, as long as all cells can be charged), the balancing circuit 18 can bring every cell 16 in the battery 14 up to 100% SOC and into balance with all of the other cells 16 in the battery 14, regardless of the SOC of each cell 16 at the start of the charge cycle.

Variations in cell characteristics do not affect the balancing performance of the balancing circuit 18. In other words, the balancing circuit 18 can fully charge and balance a battery regardless of variations in cell characteristics.

The SMDs 200 are modulated by the controller 220 to independently regulate the balancing current to each cell 16 until each cell 16 reaches Full Charge Voltage and high impedance, at which point each cell 16 has reached 100% SOC. In non-limiting embodiments, this can be accomplished while minimizing stress on the cells by modulating the SMDs 200 to establish cell voltages that will bring low voltage cells 16 up rather than bringing high voltage cells 16 down, minimizing current shunting between cells 16. In general, but without limitation, cells 16 can be brought from a discharged state up to a fully charged state in a steady upward charge cycle, with very little or no discharges from individual cells 16 as part of the balancing scheme during charging.

In addition to the advantages noted above, the present balancing circuit 18 eliminates the need to discharge cells 16 through load resistors to maintain balance and overcomes limitations on balancing range that are inherent in some systems. The present balancing circuit 18 enables use of current sensors 218 rated for only a small fraction of the ampacity of the battery, which reduces cost of the current sensing system. The full main charge current can be applied for most of the charging cycle with the balancing circuit 18 preferably switching on only when at least one cell 16 reaches Full Charge Voltage. At this point the other cells 16 have also been charged for some time and will typically be close to Full Charge Voltage. Accordingly, in example embodiments the cell balancing is performed by the instant balancing circuit 18 only near the end of each charge cycle when all of the cells 16 are near Full Charge Voltage and only a small amount of balancing current is needed to quickly balance the cells 16 and bring all of them to 100% SOC.

While the above-described balancing process contemplates cell equalization during battery charge, the same principles also may be used during battery discharge. In an embodiment, the logic in controller 220 balances the cells 16 in the battery 14 during a discharge cycle (typically when the battery 14 is powering a load). The logic that equalizes cell voltages while limiting the current on the balancing legs 212 thus may be employed during discharge cycles as well as during charge cycles.

As understood herein, balancing during discharge cycles can increase the available capacity of the battery 14. If there is a significant difference in capacities of cells 16 in the battery 14 (for example, if the smallest cell has a capacity of 90% or less of the largest cell), a management system that is typically provided for a battery will electrically disconnect the battery from the load when the smallest cell has reached a minimum cell voltage. On the other hand, if a battery is balanced during discharge, stored energy in higher voltage (or higher SOC) cells will be transferred to cells with lower voltage (or lower SOC), thereby increasing available battery capacity.

With the present balancing circuit 18, there is no need to collect, store and analyze data on battery charge and discharge cycles to try to mitigate inherent inaccuracies in estimating SOC.

Next a method for approximation or estimation of an effective balancing leg current will be described in example embodiments where a balancing system as described herein does not include hardware current sensors on balancing legs as described above. Thus, it is to be understood consistent with present principles that in lieu of a specific hardware current sensor that physically senses current through a balancing leg, estimations of current along balancing legs may also be used consistent with present principles. Without limitation, estimating balancing current as described below may be referred to as impedance limited current sensing (ILCS) below.

Figure 4:
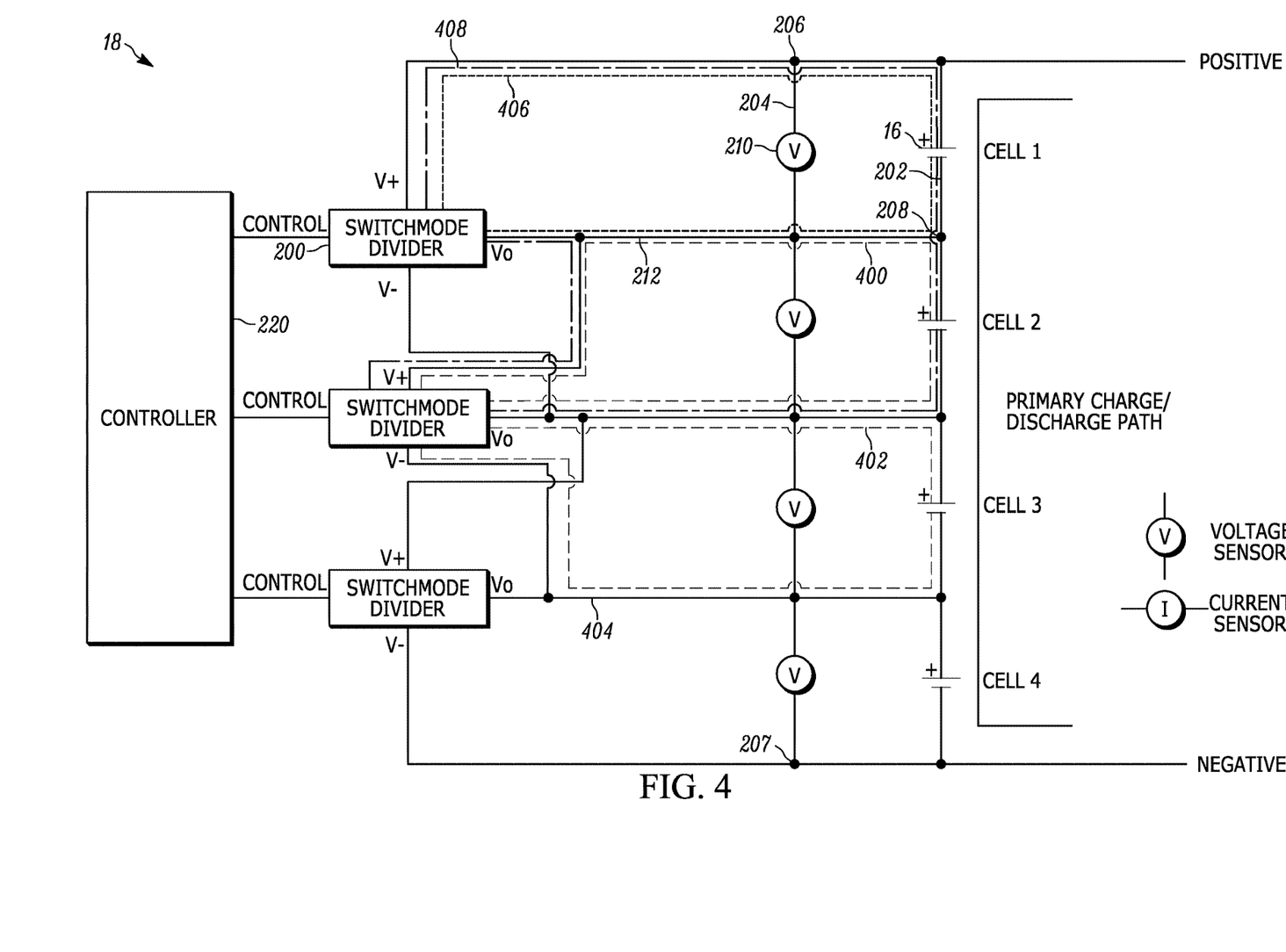
FIG. 4 is a schematic diagram of a circuit for balancing cell voltage during charging of a battery with multiple cells in series but without using hardware current sensors.

FIG. 4 again illustrates the balancing circuit 18 but with the current sensors 218 excluded from the circuit 18. As shown in FIG. 4, various balancing loops including balancing loops 400 and 402 may include a respective SMD 200 of the circuit 18 that may be characterized by an SMD output Vo along a corresponding balancing leg 212. As may also be appreciated from FIG. 4, each loop may also include two adjacent cells 16 arranged in series along the primary charge/discharge path 202 and a respective positive rail (V+) and a respective negative rail (V−) of the respective SMD 200. As shown in FIG. 4, the example loops 400, 402 may share a respective SMD Vo output as well as the two adjacent cells 16 and the loops 400, 402 may thus include a relatively low-impedance circuit path having two or more voltage sources connected in parallel. If the parallel voltages are exactly equal, then zero current will flow in the respective loop. Thus, Ohm's Law I=E/R (with "E" being voltage in this case) where E=0 will result in a current I=0 for all non-zero values of R (resistance). When the balancing system is operating, the voltage Vo for the respective SMD 200 may be adjusted in accordance with the algorithm of FIG. 3 to cause a corresponding balancing current to flow in the balancing leg circuit path. The current flowing in the respective balancing leg 212 and thus the resultant balancing current that is applied to the respective cells may be limited to a threshold level at or below the design limit of the system as described above in FIG. 3 as the threshold current, thereby preventing excessive current that can stress and/or damage the system.

Thus, an ILCS system as reflected in FIG. 4 (where there are no hardware current sensors) may be used where the controller 220 calculates an approximation of the current on the respective balancing leg 212. It may do so by characterizing the impedance of the respective loop, estimating the voltage Vo on the respective balancing leg 212 as controlled by the respective SMD 200, and receiving data from the respective voltage sensor 210 of the respective loop that is adjacent to the respective cells 16. With these numbers, the controller 220 may estimate (using Ohm's Law) the current flowing in the respective balancing leg 212 without the use of a hardware current sensor 218 to perform a direct measurement of the actual balancing leg current.

In addition to the loops 400, 402, other loops are also shown in FIG. 4 including loops 406 and 408. Each of the loops 400, 402, 406, 408 may include instances of balancing leg current(s) and SMD output(s) Vo. In non-limiting examples, the current flowing in any given balancing leg may be the algebraic sum of the currents flowing in all of the various loops, which include the respective balancing leg or legs, one or more corresponding SMD outputs Vo, and one or more corresponding battery cells. The application of Thevenin's Theorem allows the reduction of the balancing leg current to a simplified function proportional to the Vo voltage on the respective balancing leg 212 and the combined (Thevenin equivalent) loop impedance of the associated current paths and the impedance of the cell(s) 16 as shown in FIG. 4.

In non-limiting practical applications, each SMD may be connected to multiple cells using conductive paths of copper wire, connectors, and copper printed circuit board (PCB) traces. However, note that other suitable materials besides copper may also be used. Regardless, the Vo voltage of the various SMD outputs may still be adjusted by the controller 220 using the algorithm of FIG. 3 but note that the specific value at which any Vo should be set using the algorithm of FIG. 3 can be estimated even without input from a current sensor indicating a respective current in a respective balancing leg because the value of Vo is a direct function of the duty cycle of the corresponding SMD (as modulated by the controller 220) and its associated voltages V+ and V− (which may be measured by the respective voltage sensor(s) 210 in the respective loop). Employing ILCS, the impedance of all elements in the loop (including cell impedance) may be characterized and the value of Vo can be approximated for calculating an estimate of the respective balancing leg current.

The characteristic impedance of the Vo output for each SMD may be a function of the total loop impedance of the respective SMD circuit. Items that contribute to Vo output impedance may include the SMD switches (such as field-effect transistors (FETs) and/or comparable bipolar transistors), the filter inductor impedance of the SMD and the filter capacitor impedance of the SMD, and the various circuit board traces that connect these circuit elements to the Vo output electrode.

As a practical consideration, the impedances of loops such as 400, 402, 406 and 408 may be a known constant that can be determined when the system is designed or empirically at the time of manufacture, as the impedances of the loops are a function of the circuit connections that include components and conductive paths inside the SMD as well as wires, connectors and any other conductive paths between the Vo output electrode and the battery cells themselves.

Note that the impedances of individual components in the loop and the copper wire and connectors can vary with temperature and therefore if variations in impedance due to temperature fluctuations should be accounted for in a given implementation, temperature fluctuations can be determined using temperature sensors within the circuit 18. The temperature sensors might be located, for example, at or adjacent to the battery cells themselves and/or somewhere along the printed circuit board (or other components) establishing the circuit 18 itself. Temperature coefficients for the various components and elements of the circuit 18 could be stored locally, for example in a look-up table or database, and these temperature coefficients could be applied to temperature measurements taken with the temperature sensors to calculate or estimate the loop impedances, corrected for the instant local temperature. The database or look-up table may be populated based on empirical determinations made by the battery manufacturer prior to vending. Alternatively, a temperature/impedance coefficient can be calculated or estimated for the entire circuit 18 and this aggregate temperature coefficient can be applied to changes in temperature to estimate changes in impedance of the circuit 18.

To employ ILCS as a method of sensing current on the balancing legs, a basic transfer function from the PWM value of the respective SMD to the resulting balancing leg current can be established. This transfer function may be affected by multiple factors and as described herein may only need to be approximate to ensure that the high and low extents of the PWM duty cycle may be limited such that the range of resultant Vo values based on current estimation produce a balancing leg current at or below a desired threshold current magnitude. This threshold may be referred to below as a second threshold current magnitude that may be a predetermined amount less than the first threshold current magnitude described above (which is the maximum permitted threshold used to prevent overcurrent conditions). The second threshold current magnitude, which may be used in the ILCS method, may be set at a magnitude less than the first threshold current magnitude to safeguard against coming close to or exceeding the first threshold current magnitude.

For any given SMD in the circuit 18 as shown in FIG. 4, the circuit 18 can be reduced to three voltages, with those three voltages being Vo of the corresponding SMD and the voltages as measured by the voltage sensors 210 of the corresponding two cells connected to Vo. In accordance with Ohm's Law, the algebraic sum of these voltages when divided by the combined characteristic impedance of the respective loops containing those voltages may provide an approximation of the balancing leg current for the respective balancing leg.

Figure 5:
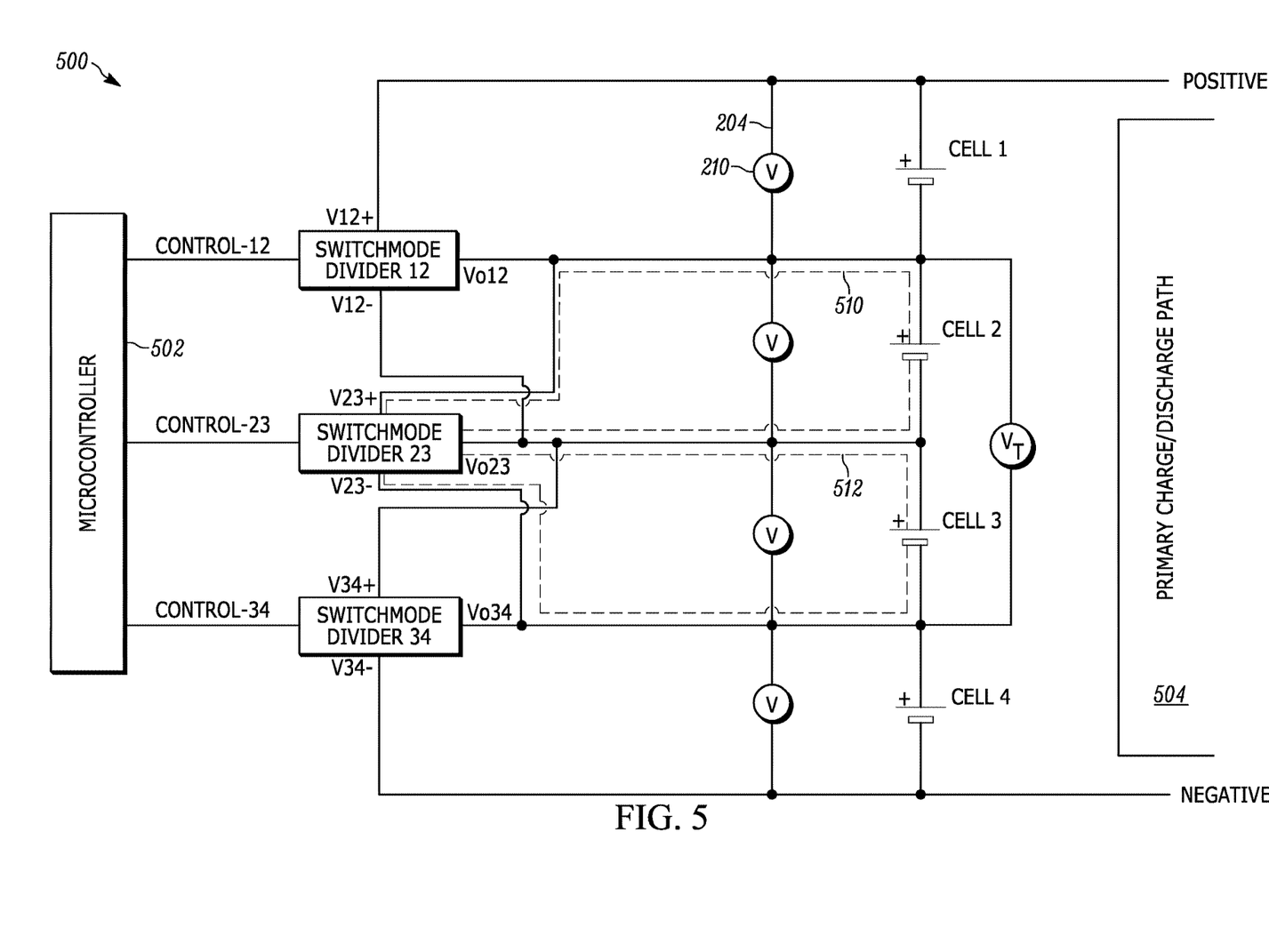
FIG. 5 is another schematic diagram of a circuit for balancing cell voltage during charging of a battery with multiple cells in series but without using hardware current sensors

Next, a numeric example of estimating Vo using ILCS will be provided in reference to a four-cell battery configuration as shown in FIG. 5. As may be appreciated from FIG. 5, a balancing circuit 500 may be similar in many respects to the circuit 18 and include many of the same components arranged similarly as in the circuit 18, including a controller 502 and primary charge/discharge current path 504 for four cells arranged in series. This example shows how to estimate Vo23 as a function of the duty cycle applied to the SMD23 so as to maintain the balancing current within a range of ±2.5 A, which (in this example) may be the second threshold current magnitude referenced above.

Describing FIG. 5, the output Vo23 may be connected to the junction of two cells, labeled CELL2 and CELL3 in FIG. 5. The high and low electrodes (V23+ and V23−) of the SMD23 may be connected respectively to the positive terminal of CELL2 and negative terminal of CELL3.

The Control-23 input of the SMD23 may be a square wave signal. The PWM duty cycle of the square wave signal may be generated by the microcontroller 502.

In one example embodiment, the high time of the square wave control signal connects V23+ to Vo23 and the low time of the square wave control signal connects V23− to Vo23. An LC circuit/filter in series with these connections may produce a DC voltage at Vo23 with respect to V23− which is proportional to the duty cycle of the square wave control signal multiplied by the total voltage ($V_T$) of the two cells CELL2 and CELL3 in series. Note that $V_T$ as shown in FIG. 5 shows where the voltage drop between the top of CELL2 and the bottom of CELL3 may be measured and is not an indication that there is a voltage sensor from the top of CELL2 to the bottom of CELL3 designated as "$V_T$". Rather, $V_T$ just illustrates where/how $V_T$ may be measured in this example using the respective voltage sensors 210 connected in parallel to CELL2 and CELL3.

As an example, and referring to SMD 23 shown in FIG. 5, if V23+ is +20 volts and V23− is +12 volts, then $V_T$ is (+20)−(+12)=+8 volts. Note that V+ may always be more positive than V− for each SMD in various example embodiments.

The duty cycle of the Control-23 square wave signal may be expressed as a scalar value between zero and one, as illustrated in the following three examples. First, a duty cycle of 1.00 may connect V23+ to Vo23 continuously. Second, a duty cycle of 0.00 may connect V23− to Vo23 continuously. Third, a duty cycle of 0.50 may connect V23+ and V23− to Vo23 alternately and for equal time periods.

Thus, a duty cycle of 0.50 may produce a symmetrical square wave which results in a value of Vo23 midway between V23+ and V23− for SMD 23, which may be expected behavior of an SMD.

Accordingly, when enabled, the respective SMD may generate a low impedance divided voltage, Vo, which may always be between V+ and V− according to the ratio of the duty cycle of the square wave control signal. Modulating the duty cycle of the control signal may therefore generate a voltage at Vo that ranges between V+ and V−, depending on the duty cycle of the modulation.

Note that a theoretically perfect circuit would have the following characteristics. First, both switches in the SMD would have zero impedance when on, and infinite impedance when off. Second, the filter inductor would have zero resistance. Third, the connections to the cells (wires and printed circuit board traces) would have zero resistance. Fourth, the respective battery cells would have zero impedance and equal voltages. With a theoretically perfect circuit, a control duty cycle of exactly 0.50 would result in a Vo value exactly equal to the voltage at the junction of the two battery cells. In this case, zero current would flow in the balancing leg because the circuit would be exactly balanced. (Note: In this context, "balanced" refers to the condition of the theoretically perfect circuit and not to the relative SOCs of the cells in the battery.) Thus, under these theoretical ideal conditions, any duty cycle other than 0.50 would imbalance the circuit and produce theoretically infinite current.

But in a real-world circuit, the aforementioned elements from the immediately preceding paragraph may have a finite nonzero resistance or impedance. As such, the duty cycle can be varied to produce an at least somewhat predictable, finite current on the balancing legs.

Two active cell balancing loops are highlighted in FIG. 5. A first cell balancing loop 510 may begin at V23+ of the SMD 23 and extend to the positive terminal of CELL2, across CELL2, to the negative terminal of CELL2, on to the SMD 23 electrode Vo23, across the SMD 23 positive side, and back to V23+ of SMD 23. As also shown in FIG. 5, a second cell balancing loop 512 may begin at V23− of SMD 23, extend to the negative terminal of CELL3, across CELL3 to the positive terminal of CELL3, on to the SMD 23 electrode Vo23, across the SMD 23 negative side and back to V23− of the SMD 23.

Currents flow in the same direction at the balancing leg around balancing loops 510 and 512, and so current flowing around balancing loops 510 and 512 will always be additive at the common balancing leg to create the total current in the balancing leg of SMD 23.

A numerical example will now be provided that uses impedance values that may be seen in a real-world circuit to illustrate how to calculate PWM duty cycles that would yield a maximum (absolute value) balancing current flowing in the balancing leg connected to Vo23 for the second threshold current magnitude referenced above when using the ILCS method. In this example, the second threshold current magnitude is ±2.5 A.

According to this example, assume each cell has an impedance of 0.004Ω. The two cell balancing loops 510, 512 of FIG. 5 may be connected in parallel, and so the parallel combination of cell impedance for this example is 0.002Ω.

The impedance values in the table below may be representative of materials at a temperature of 25° C.:

| | |
|---|---|
| SMD Vo output impedance | 0.083Ω |
| PCB trace copper | 0.006Ω |
| Cell wiring | 0.015Ω |
| Connectors | 0.006Ω |
| Two cells connected in parallel | 0.002Ω |
| Total circuit impedance | 0.112Ω |

Using this example with an effective circuit impedance of 0.112Ω, the condition that will create a maximum balancing current of 2.5 A (two and a half amps) may be a differential voltage between Vo and the cells of 0.280V by multiplying 2.5 A by 0.112Ω. One half of this voltage (0.140V) may appear across each loop 510, 512.

For example, if $V_T$ has a value of 7.4V (3.7 volts for each cell), the Vo output voltage that will result in a balancing current of +2.5 A will be 3.840V (by adding 3.7V and 0.140V). This output voltage may correspond to a duty cycle of approximately 0.5189 (by dividing 3.840V by 7.4V).

The Vo output voltage that will result in a balancing current of −2.5 A will be 3.560V (by subtracting 3.7V minus 0.140V). This output voltage may correspond to a duty cycle of approximately 0.4811 (by dividing 3.560V by 7.4V).

Therefore, in this example, setting duty cycle limits of a maximum of 0.5189 on the high side and a minimum of 0.4811 on the low side may effectively limit the balancing current between +2.5 A and −2.5 A Further, note that the calculations described in reference to this example may be applicable to a battery consisting of two cells in series. But if the battery has more than two cells in series, there will be additional current loops that are associated with SMDs that may be above or below the respective SMD under consideration. Current flowing through these adjacent loops will affect the current flowing in the balancing leg of the respective balancing loop under consideration.

Thus, in a battery with more than two cells in series, the balancing loop under consideration may need to be isolated from any cell balancing loops that are above or below it in the battery in order to characterize the impedance of the loop under consideration. This may be done by disabling (e.g., turning off the switches in) the SMDs above and below the SMD of the loop under consideration to isolate the loop under consideration. Accordingly, characterization of the limits of PWM duty cycle values in a battery with more than two cells in series may be achieved by disabling the adjacent SMDs above and below the SMD under consideration (e.g., by turning off the SMD completely and/or turning off its switches). This makes impedance very high in the adjacent control loops, which makes the adjacent control loops have negligible impact on the current flowing around the balancing loop under consideration.

For example, and referring to FIG. 5, to evaluate the PWM limits for setting Vo23 at SMD 23, the first step may be to disable SMD 12 and SMD 34. This may effectively disconnect V12− from Vo23 and effectively disconnect V34+ from Vo23. Then the calculations described above can be performed to establish the PWM values which will limit the current flowing in the respective balancing leg connected to Vo23.

Accordingly, the foregoing process of disabling SMDs above and below a subject SMD for setting the duty cycle limits of a subject SMD can be performed on any balancing loop that is associated with any subject SMD in the battery pack. For the SMD that is at the highest voltage position in the pack, it may only be necessary to disable the other SMD immediately below it. And for the SMD that is at the lowest voltage position in the pack, it may only be necessary to disable the other SMD immediately above it.

Further describing temperature correction as referenced above: The impedances of the SMD components (e.g., two transistors, inductor, capacitor, and connections), copper wire and connectors can vary with temperature. So that variations in impedance due to temperature fluctuations may be accounted for, note the following.

In many example embodiments, the impedance values of the circuit 18 may primarily be a function of copper conductors and semiconductor switch ON resistance, both of which may have a positive temperature coefficient. Therefore, the impedance values described above may decrease as the temperature decreases. Additionally, the cells may have a negative temperature coefficient which may at least partially offset the positive temperature coefficient of other elements of the circuit. The offsetting negative temperature coefficient of the cells may be relatively slight as battery cell impedance is typically a lower value than the impedance of components in the loop connected to the cell itself.

Thus, a balancing current limit value derived using the ILCS method above may be temperature dependent. Accuracy may be improved if temperature compensation of the impedance variation is employed. Temperature may be measured at the electronics and at the cells using temperature sensors. Since the impedance values of the balancing electronics may dominate over the impedance values of the battery cells, an overall positive temperature coefficient of the complete circuit (including the cells) may exist. Using impedance values that are associated with the lowest manufacturer-rated or manufacturer-specified operating temperature of the system may ensure that the balancing current is always less than the first threshold current magnitude since the current will invariably decrease as the temperature increases.

Contrasting the ILCS method as described above versus use of hardware current sensors (e.g., per FIG. 2), note that the total cost of a system using the ILCS method may be less than the cost of a system using hardware current sensors, since current sensors may be omitted from the balancing circuit when using the ILCS method. However, the ILCS method estimates balancing current in lieu of using current sensors and in some example instances may be less accurate than using hardware current sensors. Thus, relative to using hardware current sensors, the ILCS method in at least some instances may have a larger error term associated with the resulting Vo balancing current value and therefore may be compared to the second threshold current magnitude value mentioned above to provide a greater safety buffer to prevent overcurrent conditions. For example, if the ILCS method has an inherent error of ±20% for a given system, and if the maximum balancing current that the system can tolerate is 3 Amperes (the first threshold current magnitude described above), then the second threshold magnitude current may be set at 2.5 Amperes (positive or negative) or even less to assure that the actual balancing current (as opposed to the estimate of balancing current) does not exceed the 3-Ampere threshold.

Thus, the second threshold current magnitude value may be limited so as to stay safely away from and not exceed the design capabilities of the balancing hardware. The calculated (or estimated) magnitude of Vo when using ILCS may therefore be less precise than if current sensors are used, so the second threshold current magnitude value may be set such that the value of Vo yields a balancing leg current that is consistently restricted from exceeding the first threshold current magnitude value which could compromise the reliability or safety of the balancing system hardware.

Accordingly, the ILCS method of sensing balancing current can provide cost savings by eliminating the hardware current sensors 218 from the system, with possible reduced accuracy in some examples in the estimation of balancing current and with possible reduced accuracy in some examples in the estimation of cell characteristics (which may include cell state of health (SOH)). In general, changes in cell SOH can be caused in many instances by changes in cell capacity and changes in effective impedance of the cell, and so the greater accuracy of characterizing cell impedance that is afforded by hardware current sensors may enable more accurate characterization or estimation of cell characteristics such as state of health (SOH) in at least some examples.

In example embodiments where hardware current sensors are not used and the ILCS method is employed as a method of sensing balancing current, it may be useful to occasionally recalibrate the total loop impedance for the respective loop. Recalibration may involve periodic application of reference currents on the primary charge path to the complete string of cells in series when the battery is otherwise unloaded (e.g., not being used to power other systems external to the battery pack itself, such as a computer or vehicle) and when the battery is not being charged. The periodic application of reference currents for recalibration may be based on a recurring period of time recommended by the battery's manufacturer, such as every hour, every day, every week, every year, or even after a predetermined number of charge cycles greater than one (e.g., every five cycles or every few hundred cycles). The reference currents can be switched on at two or more known levels. For example, an initial reference current can be applied at 100% of the first current magnitude threshold and then a subsequent reference current can be applied at 50% of the first current magnitude threshold. Measuring the resulting cell voltages at the two or more reference currents using voltage sensors 210 may therefore be used to estimate effective impedance of the cells at any given time. Taking these measurements thus provides an updated estimate of the effective impedance of the cells for use in the ILCS mathematical model. The parameters of the Vo transfer function can thus be updated to compensate or correct for variations in cell impedance characteristics that occur over time and use of the battery.

For example, in a balancing system where 3 A establishes the first current magnitude threshold, the 100% reference level current (3.000 amperes) might produce a cell voltage of 3.850V depending upon the state of charge (SOC) of the cell. A 50% reference current (1.500 amperes) applied to the same impedance loop might produce a cell voltage of 3.843V. Subtracting 3.850V minus 3.843V yields a difference of 7 mV. In this example, the change in current of 1.5 A (3.0*A* minus 1.5 A) may produce a differential voltage of 7 mV. Using Ohm's Law (7 mV/1.5 A), these measurements indicate a cell effective impedance of 4.67 mΩ. Using this reference current method, the effective impedance of the individual cells can be measured and then added to or subtracted from the total loop impedance of the Vo balancing leg and cell circuits.

The present application also recognizes that battery cell impedance may change over time such that cell impedance may increase as the cell continues to age. Using hardware current sensors, recalibration in response to changes in cell impedance may not be required since, in using hardware current sensors, any change in cell impedance can be characterized using the current sensors 218.

To reiterate, note that calibration may not be needed if the battery has and employs the hardware current sensors described above. Calibration (or recalibration) can optionally be performed when employing the ILCS method for balancing leg current sensing and limiting. In practice, recalibration may in some instances only be desirable to maintain the highest balancing leg current that is possible as cell impedance increases with age while providing a suitable safety buffer between second current magnitude threshold and the first current magnitude threshold. As cell impedance increases with age, current for cell balancing will correspondingly decrease over time, thus maintaining the limited maximum balancing leg current below the first current magnitude threshold in embodiments that employ ILCS without calibration. Thus, while employing ILCS, calibration or recalibration may not be needed to maintain safety, but it can be employed to keep the balancing leg current as high as possible as the cells degrade to allow the most efficient balancing of cells that is possible for a given age of the battery. Without recalibration, ILCS may still be used and be effective at estimating balancing leg current but may in some instances keep balancing leg current at less than maximum possible values as time goes on.

The above methods may be implemented as software instructions executed by a controller 220 such as a processor, a suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. An assembly, comprising:
   at least one switch mode divider (SMD) connectable in parallel to at least one respective battery cell and operable to equalize voltages among plural battery cells based on signals from at least one voltage sensor, the SMD being characterized by a control output voltage Vo that is a function of a duty cycle of a drive waveform and high and low rail voltages; and
   at least one circuit that generates a signal representative of current and being associated with a control output voltage of the at least one SMD to enable the SMD to limit current from the SMD to at least one of the battery cells during charging.

2. The assembly of claim 1, wherein the circuit comprises a current sensor that generates the signal based on current sensed by the current sensor.

3. The assembly of claim 1, wherein the circuit comprises a controller that generates the signal based on an estimation of current.

4. The assembly of claim 3, wherein the controller uses Ohm's law to estimate the current.

5. The assembly of claim 3, wherein the controller modulates the at least one SMD based on the estimation to limit current through at least one balancing leg associated with the at least one SMD to be no more than a threshold current magnitude.

6. The assembly of claim 5, wherein the threshold current magnitude is a second threshold current magnitude, and wherein the second threshold current magnitude is a predetermined amount less than a first threshold current magnitude at which battery cell stress occurs due to overcurrent.

7. The assembly of claim 6, wherein the controller is preprogrammed with the second threshold current magnitude.

8. The assembly of claim 3, wherein the estimation of current is based at least in part on at least one estimation of impedance for at least part of the assembly.

9. The assembly of claim 8, wherein the estimation of impedance is based at least in part on at least one temperature coefficient to estimate change in impedance at a given temperature.

10. The assembly of claim 9, wherein temperature is sensed for estimating changes in impedance due to changes in temperature using at least one temperature sensor in the assembly.

11. The assembly of claim 10, comprising at least one temperature sensor and comprising the plural battery cells.

12. The assembly of claim 11, wherein the temperature sensor senses temperature of electronics.

13. An apparatus, comprising:
at least first and second battery cells arranged in electrical series with each other and defining a primary charge/discharge path;
a balancing circuit arranged in electrical parallel with the primary charge/discharge path, the balancing circuit comprising:
a voltage sensor line comprising a respective positive node and a respective negative node and;
at least one cell junction between respective adjacent battery cells;
at least one voltage sensor;
a respective switch mode divider (SMD) connected to a respective cell junction; and
at least one controller controlling the respective SMDs to equalize voltages among battery cells.

14. The apparatus of claim 13, comprising:
a respective current sensor electrically connected to a respective balancing leg and useful to enable the respective SMD to limit current through the respective balancing leg to which the current sensor is connected.

15. The apparatus of claim 13, wherein the controller controls the respective SMD to limit current through the respective balancing leg based on an estimation of current in the respective balancing leg.

16. The apparatus of claim 15, wherein the estimation of current in the respective balancing leg is based at least in part on an impedance of the respective balancing leg.

17. A method, comprising:
modulating at least one switch mode divider (SMD) associated with respective battery cells to equalize voltage among the battery cells during battery charge, the SMD characterized by being driven by a constant period signal having an ON time and OFF time, the sum of which equals to a total constant period; and
limiting current in at least one balancing leg associated with the at least one SMD to satisfy a threshold.

18. The method of claim 17, wherein at least the balancing is executed only after at least one battery cell reaches full charge voltage during battery charge.

19. The method of claim 17, comprising limiting current in at least one balancing leg associated with the at least one SMD to satisfy a threshold at least in part using a current sensor that provides input to a controller, and comprising using the controller to modulate the SMD to limit current in the at least one balancing leg to a threshold based on the input from the current sensor.

20. The method of claim 17, comprising limiting current in at least one balancing leg associated with the at least one SMD to satisfy a threshold during battery discharge.

21. Assembly, comprising:
at least one switch mode divider (SMD) connectable in parallel to at least one respective battery cell and operable to equalize voltages between plural cells during charging or discharging of the cells; and
at least one current sensor associated with a control output voltage of the at least one SMD to enable the SMD to limit current from the SMD to at least one of the cells during charging or discharging.

22. The assembly of claim 21, comprising the battery cells, the battery cells comprising Lithium-ion cells.

23. A method, comprising:
modulating at least one switch mode divider (SMD) associated with respective battery cells to equalize voltage between the cells during battery charge or discharge; and
limiting current in at least one balancing leg associated with the at least one SMD to satisfy a threshold.

24. The method of claim 23, wherein at least the balancing is executed only after at least one cell reaches full charge voltage during battery charge.

25. The method of claim 23, comprising limiting current in at least one balancing leg associated with the at least one SMD to satisfy a threshold at least in part using a current sensor providing input to a controller and using the controller to modulate the SMD to limit current in the at least one balancing leg to a threshold based on the input from the current sensor.

26. The method of claim 23, comprising limiting current in at least one balancing leg associated with the at least one SMD to satisfy a threshold during battery discharge.

27. The method of claim 17, comprising recalibrating by periodic application of reference currents on a primary charge path to the cells when the battery is otherwise unloaded and not being charged.

28. The method of claim 17, comprising turning on balancing prior to any cell reaching full charge voltage.

* * * * *